(12) United States Patent
Zimmerman

(10) Patent No.: US 10,000,189 B2
(45) Date of Patent: Jun. 19, 2018

(54) HYDRAULIC JACK RETROFIT FOR TRAILER

(71) Applicant: Jay Paul Zimmerman, Cantril, IA (US)

(72) Inventor: Jay Paul Zimmerman, Cantril, IA (US)

( * ) Notice: Subject to any disclaimer, the term of this patent is extended or adjusted under 35 U.S.C. 154(b) by 0 days. days.

(21) Appl. No.: 15/620,496

(22) Filed: Jun. 12, 2017

(65) Prior Publication Data

US 2018/0056947 A1     Mar. 1, 2018

Related U.S. Application Data

(60) Provisional application No. 62/379,580, filed on Aug. 25, 2016.

(51) Int. Cl.
| | |
|---|---|
| *B60S 9/08* | (2006.01) |
| *B60D 1/66* | (2006.01) |
| *B60S 9/12* | (2006.01) |
| *B60S 9/04* | (2006.01) |
| *B60S 9/06* | (2006.01) |

(52) U.S. Cl.
CPC .................. *B60S 9/12* (2013.01); *B60D 1/66* (2013.01); *B60S 9/08* (2013.01); *B60S 9/04* (2013.01); *B60S 9/06* (2013.01)

(58) Field of Classification Search
CPC .... B60S 9/08; B60S 9/126; B60S 9/12; B60S 9/04; B60S 9/06; B60D 1/66
USPC ........... 254/419, 425, 423; 280/766.1, 763.1, 280/475; 29/401.1
See application file for complete search history.

(56) References Cited

U.S. PATENT DOCUMENTS

| | | | |
|---|---|---|---|
| 5,011,119 A | 4/1991 | Harrington | |
| 5,865,499 A * | 2/1999 | Keyser | B60P 3/34 296/156 |
| 5,897,121 A * | 4/1999 | Case | B25B 13/48 254/133 R |
| 5,911,437 A * | 6/1999 | Lawrence | B60S 9/10 254/419 |
| 6,598,886 B2 * | 7/2003 | Baird | B60P 1/56 254/419 |
| 6,926,305 B2 * | 8/2005 | Daniel | B60S 9/08 254/419 |

(Continued)

OTHER PUBLICATIONS

Easy Lifter Kit EZ6PNP—Zimmerman Trailers Website.*

(Continued)

*Primary Examiner* — Christopher M Koehler
*Assistant Examiner* — Mahdi H Nejad
(74) *Attorney, Agent, or Firm* — Goodhue, Coleman & Owens, P.C.

(57) ABSTRACT

A system for retrofitting a trailer having a crank jack with a jack housing and a drop leg includes a hydraulic cylinder including a main cylinder and a ram piston extending outwardly therefrom as the main cylinder is filled with pressurized fluid, a first mounting ear on the hydraulic cylinder and a second mounting ear on the hydraulic cylinder, the first mounting ear opposite the second mounting ear, a cylinder port positioned orthogonally to the first mounting ear and the second mounting ear and positioned between the first mounting ear and the second mounting ear, and a conversion foot sized and shaped to fit within the jack housing and adapted to support the hydraulic cylinder.

10 Claims, 6 Drawing Sheets

(56) References Cited

U.S. PATENT DOCUMENTS

| | | | |
|---|---|---|---|
| 7,163,207 B2 | 1/2007 | Baird et al. | |
| 8,590,417 B1* | 11/2013 | Bono | G05G 1/085 |
| | | | 254/419 |
| 8,919,738 B2* | 12/2014 | Daniel | B60S 9/12 |
| | | | 254/418 |
| 2003/0209896 A1* | 11/2003 | Daniel | B60S 9/08 |
| | | | 280/766.1 |
| 2004/0104381 A1* | 6/2004 | Sharp | B60S 9/12 |
| | | | 254/423 |
| 2007/0210289 A1* | 9/2007 | Drake | B66F 3/16 |
| | | | 254/103 |
| 2009/0008917 A1* | 1/2009 | Daniel | B60S 9/06 |
| | | | 280/766.1 |
| 2014/0048759 A1* | 2/2014 | Seidel | B60D 1/155 |
| | | | 254/419 |
| 2015/0137498 A1* | 5/2015 | Klassy | B60S 9/02 |
| | | | 280/763.1 |
| 2016/0244030 A1* | 8/2016 | Lehman | B66F 3/25 |

OTHER PUBLICATIONS

Easy Lifter Kit EZ9CNP—Zimmerman Trailers Website.*
Zimmerman Pro Series 12K Dropleg Jack; Zimmerman Trailers Parts Website.*
Convert Your Trailer Jack to Hydraulic; Farm Show Magazine; Inventor: J.L. Sharp.*
International Search Report and the Written Opinion, PCT/US2017/048408 (dated Nov. 2, 2017).

* cited by examiner

HYDRAULIC JACK RETROFIT FOR TRAILER

PRIORITY STATEMENT

This application claims priority to U.S. Provisional Patent Application 62/379,580, filed on Aug. 25, 2016, and entitled Hydraulic jack retrofit for trailer, hereby incorporated by reference in its entirety.

FIELD OF THE INVENTION

The present invention relates to trailers. More particularly, but not exclusively the present invention relates to a hydraulic jack retrofit for trailers, and more specifically for manual trailer jacks.

BACKGROUND

Trailers come with jacks such as a crank style drop leg jacks. However, this type of manually operated jack is often disfavored because of the amount of time and effort it takes to raise and lower the trailer. Some trailer owners choose to install an electric assist trailer jack. However, often times this is still problematic because of the substantial time it may take to lift and lower a trailer.

Trailer owners may remove the original manufacturer jack and replace it with a hydraulic jack. However, there are problems with doing so. For example, the time and expense of the install and rework necessary to install a hydraulic jack and the possibility of weakening the tongue or frame of the trailer as a result of the install are problematic. Such a retrofit involves cutting into the trailer, damaging the powder coating, paint or other finish of the trailer. Thus, this solution is particularly disfavored when the trailer is new or in good condition.

Trailer manufacturers may sell trailers with the crank style drop leg jacks and provide an option of hydraulic jacks. However, this can create problems for dealers who may need to maintain an inventory of a selection of different trailers some with the factory installed option and others without it.

Therefore, what is needed is a hydraulic jack and installation method which is acceptable to trailer owners and addresses the problems with current electric and hydraulic jacks.

SUMMARY

Therefore, it is a primary object, feature, or advantage of the present invention to improve over the state of the art.

It is a further object, feature, or advantage of the present invention to provide a hydraulic trailer jack and a method of installation which allows a standard crank jack to be retrofitted or converted into the hydraulic jack.

One or more of these and/or other objects, features, or advantages of the present invention will become apparent from the specification and claims that follow. No single embodiment need provide each and every object, feature, or advantage. Different embodiments may have different objects, features, or advantages. Therefore, the present invention is not to be limited to or by an objects, features, or advantages stated herein.

According to one aspect a system for retrofitting a trailer having a crank jack with a jack housing is provided. The system includes a hydraulic cylinder comprising a main cylinder and a ram piston extending outwardly therefrom as the main cylinder is filled with pressurized fluid, a first mounting ear on the hydraulic cylinder and a second mounting ear on the hydraulic cylinder, the first mounting ear opposite the second mounting ear, a cylinder port positioned orthogonally to the first mounting ear and the second mounting ear and positioned between the first mounting ear and the second mounting ear, and an assembly attached to the ram piston for operatively connecting the hydraulic cylinder to a drop leg of the jack. The system may further include a cap for the hydraulic cylinder. The system may further include a hole saw bit for making a hole in the jack housing of the trailer such that the cylinder port can extend outwardly through the hole. The system may further include a hydraulic pump for providing the pressurized fluid, a plurality of hoses for connecting to the hydraulic pump and the hydraulic cylinder, a hydraulic splitter, and a batter. Instructions for performing the retrofit may also be provided.

According to another aspect, a method of retrofitting a trailer having a crank jack and a jack housing with a hydraulic jack is provided. The method includes removing a top cap off of the jack housing, stripping mechanical components from within the jack housing, the mechanical components including gears and springs, cutting a platform from within the jack housing, and drilling a hole through an outer surface of the jack housing. The method may further include providing a hydraulic cylinder comprising a main cylinder and a ram piston extending outwardly therefrom as the main cylinder is filled with pressurized fluid, a first mounting ear on the hydraulic cylinder and a second mounting ear on the hydraulic cylinder, the first mounting ear opposite the second mounting ear, a cylinder port positioned orthogonally to the first mounting ear and the second mounting ear and positioned between the first mounting ear and the second mounting ear, and an assembly attached to the ram piston for operatively connecting the hydraulic cylinder to a drop leg of the jack. The method may include installing the hydraulic cylinder within the jack housing such that the cylinder port is positioned at the hole through the outer surface of the jack housing and the assembly is operatively connected to the drop leg of the jack. The method may further include securing the hydraulic cylinder to the jack housing using the first mounting ear and the second mounting ear; and connecting hoses to the cylinder port and an opposite cylinder port.

DETAILED DESCRIPTION

The present invention relates to a hydraulic jack retrofit for trailers and specifically manual trailer jacks. A trailer and tongue having an original manufacturer drop leg jack which can be welded to the frame and/or tongue of the trailer may be retrofitted according to one aspect of the present invention to provide a hydraulic jack. For example, the drop leg jack may be a Jack 10K Lift Dropleg SW GN (Pro Series) such as may be present on a PJ Trailer. Of course, any number of other drop legs jacks on any number of different brands or types of trailers may be used. The present invention provides for retro-fitting the manual drop leg jack without cutting the jack from the trailer or disturbing the powder coating, paint, or other finish of the trailer.

Figure 1:
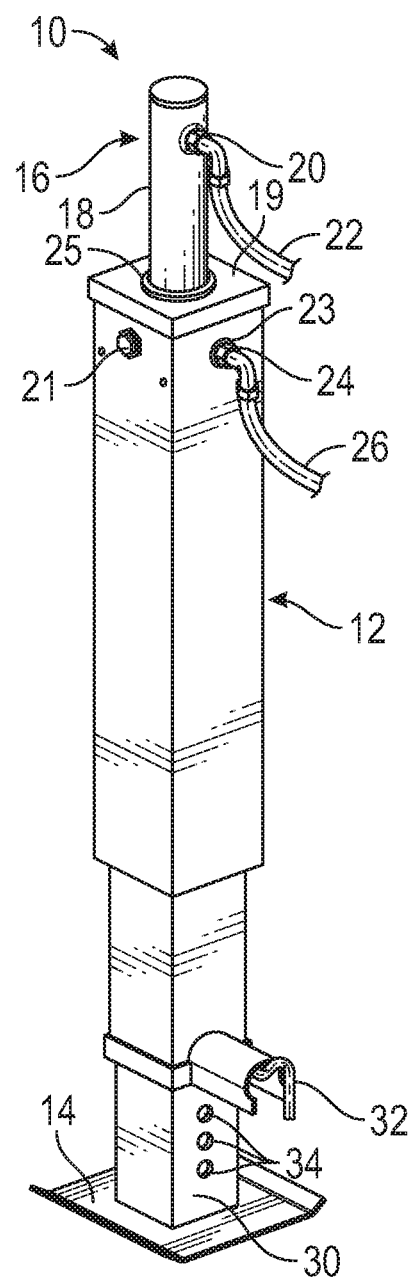
FIG. 1 illustrates an original manufacturer drop leg jack which is retrofitted or converted to provide a hydraulic jack.

FIG. 1 illustrates one example of a manual trailer jack retrofitted with a hydraulic jack. The retrofitted jack 10 has a jack housing 12 which is the original manual trailer jack housing which has been retrofitted to allow installation of the hydraulic cylinder 16. A support plate 14 is shown for supporting the jack. Extending upwardly from the support plate 14 is a drop leg 30. A plurality of openings 34 are shown in the drop leg 30 at different heights. A release pin 32 is provided. As shown, the retrofitted jack 10 is in a partially extended position. A cover 19 may be attached at the top of the jack housing 12. The cover 19 may be made of stainless steel with a tread pattern or of other suitable material and has an aperture 25 through which a portion of a housing 18 of the hydraulic cylinder extends.

At the top of the jack housing 12 apertures are present including a hydraulic port aperture 23 through which a hydraulic port 24 of the hydraulic cylinder 16 extends and a first mounting aperture 21 for securing the hydraulic cylinder 16 to the jack housing 12. A second mounting aperture (not shown) may be opposite the first mounting aperture 21.

Figure 2:
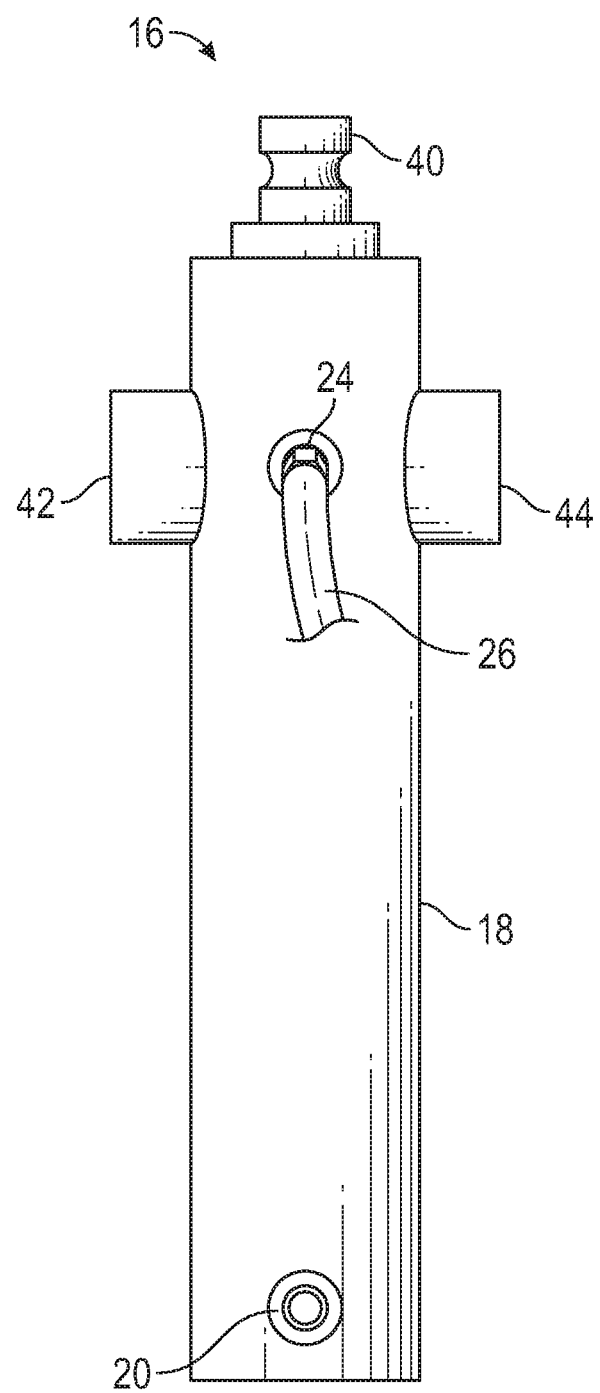
FIG. 2 illustrates one example of a hydraulic cylinder for retrofitting the hydraulic jack.

The hydraulic cylinder 16 has a housing 18 with a first hydraulic cylinder port 20 and a second hydraulic cylinder port 24. A first hydraulic line 22 is connected to the first hydraulic cylinder port 20 and a second hydraulic line 26 is connected to the second hydraulic cylinder port 24. FIG. 2 illustrates the hydraulic cylinder 16 outside of the jack housing 12. The hydraulic cylinder 16 has a housing with a ram 40 extending outwardly therefrom. The hydraulic cylinder 16 may be custom manufactured. The hydraulic cylinder 16 shown and described herein was custom manufactured to design criteria by Fox Valley Welding in Milton, Iowa. The hydraulic cylinder 16 is generally short in length in order to better fit the pre-existing manual jack housing. Mounting ears 42, 44 extend from opposite sides of the hydraulic cylinder 16 in order to mount the hydraulic cylinder 16 within the pre-existing manual jack housing.

The cylinder has a first hydraulic cylinder port 20 and a second hydraulic cylinder port 24. The ports may have standard thread dimensions in order to accept hydraulic fittings which are used to introduce hydraulic fluid into the hydraulic cylinder.

Note that the hydraulic cylinder ports 20, 24 are orthogonal or at a right angle relative to the mounting ears 42, 44. The hydraulic cylinder port 24 may extend through an opening created in the manual jack housing as a part of the retrofit. In operation, hydraulic pressure pushes the ram piston 40 and the drop leg jack downward in order to raise the trailer.

Figure 3:
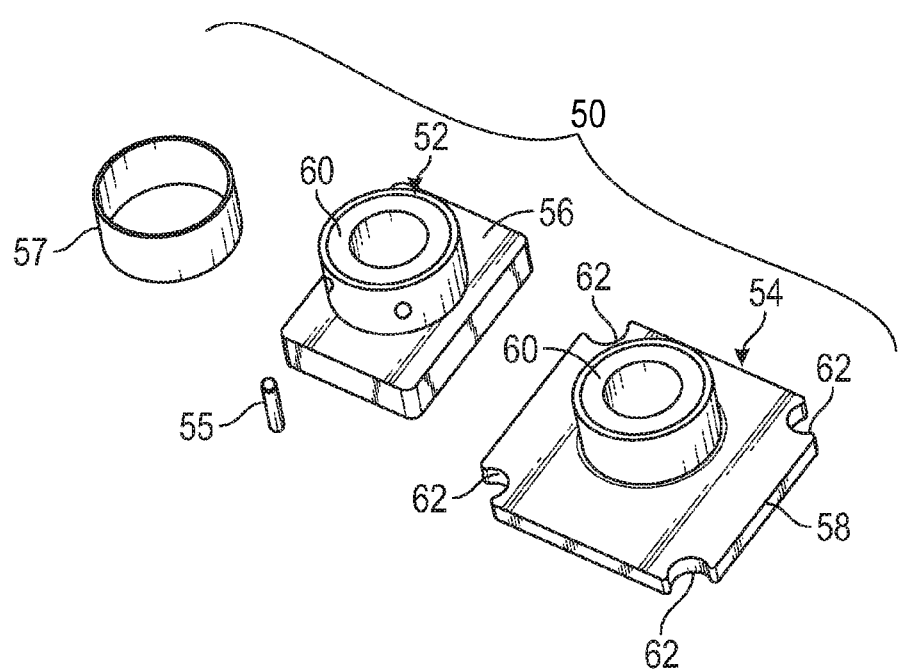
FIG. 3 illustrates examples of conversion feet.

FIG. 3 illustrates two examples of conversion feet 50 including a first conversion foot 52 and a second conversion foot 54. A retrofit kit may include more than one type of conversion foot in order to accommodate different jacks. The first conversion foot 52 has a base portion 56 which has a rectangular cross-section for fitting snugly within the jack housing. A cylindrical portion 60 extends upwardly from the base portion 56. Similarly, the second conversion foot 54 has a base portion 58, which has a generally square cross-section except that it includes corner cutouts 62 so as to fit within a jack housing. A cylindrical portion 60 extends upwardly form the base portion 58. In a conversion kit, the hydraulic cylinder may be included as well as one or more conversion feet, a hydraulic pump, hoses, a hydraulic splitter, or other appropriate components. A retainer ring 57 and a keeper pin 55 are also shown. In order to connect the hydraulic cylinder with one of the conversion feet, 52, 54, the retainer ring may be placed over the shaft of the hydraulic cylinder and the keeper pin 55 may be used to lock the cylinder in place. The retainer ring 57 may then be allowed to fall from the cylinder shaft onto the base foot in order to retain the keeper pin.

Figure 4:
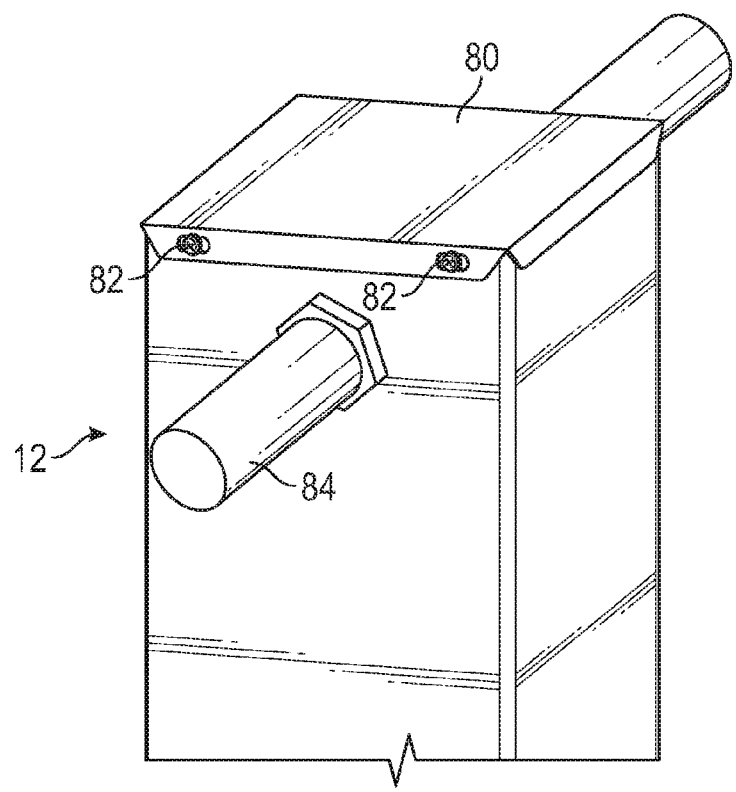
FIG. 4 illustrates a view of a topmost portion of a jack prior to beginning the conversion process.

FIG. 4 illustrates one example of a jack prior to conversion. As shown in FIG. 4, there is the jack housing 12. A top cover 80 is positioned on the top end of the jack housing 12 and is secured in place with fasteners 82 which may take the form of bolts or screws or other appropriate fasteners. A shaft 84 is shown which extends end to end through the jack housing 12. In order to perform a conversion, in order to remove the top cover 80, the fasteners 82 are removed. The shaft 84 may also be removed as well as any gearing (not shown).

Figure 5:
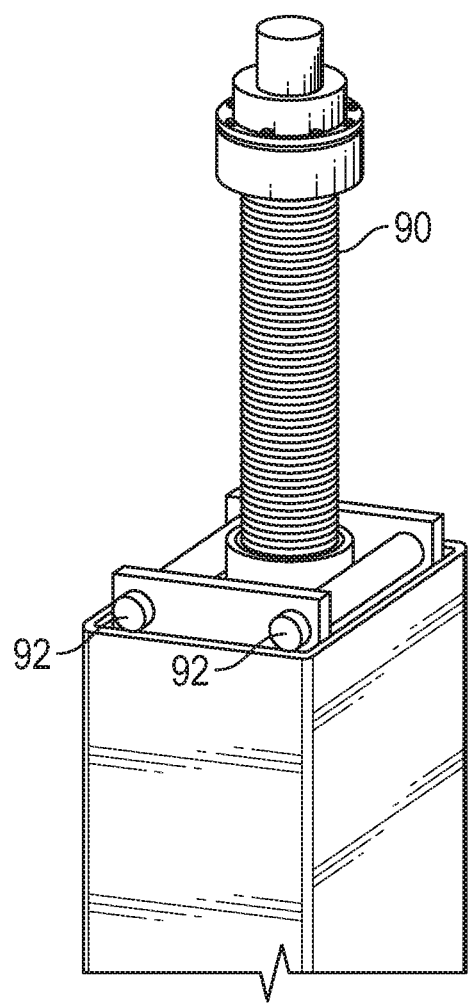
FIG. 5 is a view of a jack during the conversion process where the worm screw is exposed.
Figure 6:
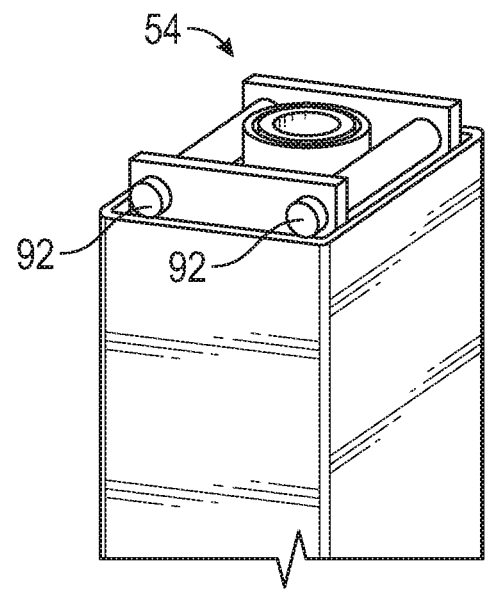
FIG. 6 is a view of the jack during the retrofitting process with a conversion foot installed.

FIG. 5 illustrates the jack during the conversion process where the worm screw or gear is exposed. The worm gear 90 is accessible and may be removed by removal of the pins 92. After the worm gear 90 is removed, it may be replaced with one of the conversion feet. As shown in FIG. 6, the second conversion foot 54 is inserted. The pins 92 may then be replaced to secure the conversion foot 54 in place. The pins 92 may be a part of the original jack which have been removed and then replaced during the retrofitting process.

Figure 7:
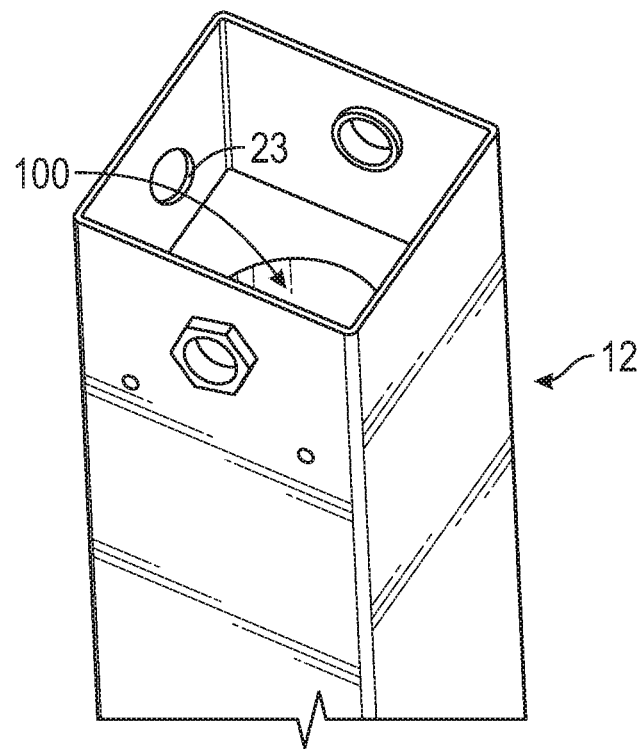
FIG. 7 illustrates the jack modified to remove a platform and to add an opening for a hydraulic port.
Figure 8:
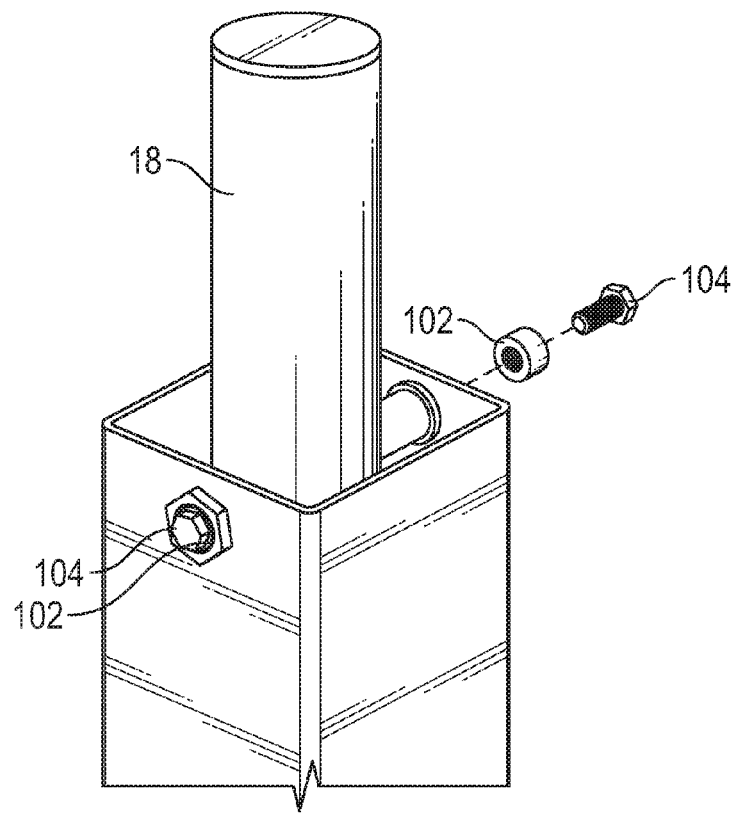
FIG. 8 illustrates the jack during the conversion process while the hydraulic cylinder is being attached to the jack housing.

As shown in FIG. 7, the jack housing 12 may be modified by cutting a center hole 100 out of a platform in the jack housing. A hole or hydraulic port aperture 23 is cut in the front of the jack housing 12. The jack housing 12 may then be re-installed. FIG. 8 illustrates the jack housing 12 after it is returned. Sleeves 102 are then inserted in the location that the shaft used to be. Bolts 104 are then used to secure the sleeve and the hydraulic cylinder 16 in place at the ears of the hydraulic cylinder 16.

Figure 9:
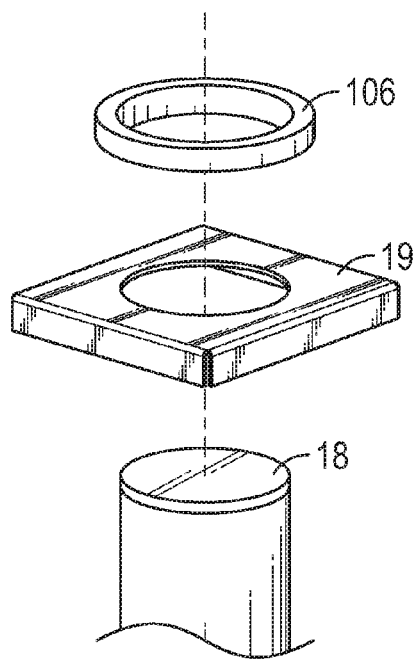
FIG. 9 illustrates a top cover and grommet being installed over a hydraulic cylinder and on to the jack housing.

As shown in FIG. 9, the top cover 19 may then be replaced over the cylinder. A grommet 106 may also be inserted to create a seal with the top cover 19. In addition, hydraulic nipples (not shown) may then be installed on the hydraulic cylinder.

A hydraulic retrofit kit may be provided to allow for the removal of the manual jack and replacement with a hydraulic jack. The kit may include the hydraulic cylinder itself along with a hydraulic pump, battery, hydraulic splitter block and hoses (e.g. six hoses) to connect with the hydraulic jack. The hydraulic pump, splitter, and hoses may be of conventional design. The kit may also include a hole saw bit such as a 2½ inch bit or other suitable size which can make an opening in the manual jack housing and may be used to cut out the platform in the jack. The kit may also include a top cover or cap as previously shown to cap the top portion of the hydraulic cylinder along with the grommet. The kit may further include the sleeves, hydraulic nipples, and one or more conversion feet. Thus, after retrofit, the original leg remains as does the sleeve or housing for the manual jack. Note that the powder coat, paint, or other finish of the trailer is not damaged. The retrofit process may be relatively quickly performed such as within a few hours or less depending upon the skill and speed of the individual performing the retrofit.

In installing the retrofit kit to transform a manual crank style jack to a hydraulic jack on a trailer, the process may include first, blocking trailer wheels to ensure that the trailer does not move for safety reasons. Next, the trailer may be lifted with another jack and secured with jack stands. The adjustable drop leg of the crank style jack may then be lifted to its highest setting to in removal at a later step. The top cover may then be removed from the jack. The crank and cross shaft from the jack may then be removed. Next, the spring in the top of the jack housing may be compressed and the roll pin securing the shaft may be removed. The shaft, spring, gear, and washer may then be removed. Temporary blocking may then be placed under the jack drop leg. The roll pin securing the worm drive gear may then be removed. Next, the drop leg and the worm gear from the lower end of the jack tube may be removed. Next, the base that the worm gear rotated in may be removed and the correct conversion base foot may be installed in its place. Next, a hole (e.g. preferably a 2 inch or larger hole) may be cut or drilled in the plate inside the upper portion of the jack housing that previously supported the worm gear. If a torch is used for cutting, care should be taken to ensure that the finish on the jack housing is not damaged. Next, a hole (e.g. 1⅛ inch) may be drilled in the face of the jack housing. The location of the hole may be centered side to side and two inches from the top. Next, the hydraulic cylinder may be fully extended. Keeper pin may be placed in the base foot and the drop leg may be reinstalled in the jack housing. The drop leg may be lifted as high as possible and blocked in an upright position. The grease zerk in the face of the jack base may be removed. A retainer ring may be placed onto the cylinder shaft and inserted into the cylinder shaft end into the top of the jack housing. When the cylinder end enters the base foot, one may reach through the grease zerk opening with a small tool and push the keeper pin ton the locked position. The retainer ring may then fall from the cylinder shaft onto the base foot to lock the keeper pin. Next the cylinder may be manually retracted and the mounting holes may be aligned with the shaft openings in the jack housing. The busing may be placed in the shaft openings on either side of the jack housing and secured by placing bolts in either side of the jack base into the housing. Fittings may be inserted into the hydraulic cylinder and may be attached to the appropriate hydraulic hoses. Next the electric/hydraulic power unit may be mounted in a weather protected location to increase service longevity. A splitter block or check valve may then be mounted as the particular application may require. Hydraulic hoses may then be installed in a series to complete the proper fluid circuits. The correct hydraulic fluid may then be used to fill the reservoir (e.g. AW-32). The electric power supply may then be attached to the electric/hydraulic power unit.

Therefore, a hydraulic retrofit kit and associated methods have been shown and described. Although specific embodiments are shown and described herein, it is to be understood that the present invention contemplates numerous options, variations, and alternatives in sizes and dimensions, variations in materials, and variations in the specific component parts including within a kit.

What is claimed is:

1. A method of retrofitting a crank jack of a trailer to a hydraulic jack, the crank jack having a jack housing and a jack leg, the method comprising:
    removing a top cap from the jack housing;
    stripping mechanical components from within the jack housing, the mechanical components comprising gearing;
    cutting a platform from within the jack housing;
    drilling a hole through an outer surface of the jack housing;
    placing a hydraulic cylinder within the jack housing, wherein the hydraulic cylinder comprises a main cylinder and a ram piston extending outwardly therefrom as the main cylinder is filled with pressurized fluid, a first mounting ear on the hydraulic cylinder and a second mounting ear on the hydraulic cylinder, the first mounting ear opposite the second mounting ear, a cylinder port positioned orthogonally to the first mounting ear and the second mounting ear and positioned between the first mounting ear and the second mounting ear; and
    securing the hydraulic cylinder to the jack housing using the first mounting ear and the second mounting ear such that the cylinder port is positioned at the hole through the outer surface of the jack housing.

2. The method of claim 1 further comprising installing a conversion foot within the jack housing prior to installing the hydraulic cylinder.

3. The method of claim 2 further comprising removing pins from the jack housing that secure a worm gear and after removal of the worm gear, replacing the pins in the jack housing to secure the conversion foot.

4. The method of claim 3 further comprising placing a top cover over a top end of the hydraulic cylinder and onto the jack housing.

5. The method of claim 4 further comprising sealing the top cover with a grommet.

6. The method of claim 1 further comprising connecting hoses to the cylinder port and an opposite cylinder port.

7. A method of retrofitting a crank jack of a trailer to a hydraulic jack, the crank jack having a jack housing and a jack leg, the method comprising:
    providing a kit comprising (a) a hydraulic cylinder comprising: a main cylinder and a ram piston extending outwardly therefrom as the main cylinder is filled with pressurized fluid, a first mounting ear on the hydraulic cylinder and a second mounting ear on the hydraulic cylinder, the first mounting ear opposite the second mounting ear, a cylinder port positioned orthogonally to the first mounting ear and the second mounting ear and positioned between the first mounting ear and the second mounting ear, (b) a conversion foot sized and shaped to fit within the jack housing and adapted to support the hydraulic cylinder;
    removing a top cap from the jack housing;
    stripping mechanical components from within the jack housing, the mechanical components comprising gearing;
    cutting a platform from within the jack housing;
    drilling a hole through an outer surface of the jack housing;
    placing the conversion foot within the jack housing and securing with pins;
    placing the hydraulic cylinder within the jack housing such that the cylinder port is positioned orthogonally to the first mounting ear and the second mounting ear and positioned between the first mounting ear and the second mounting ear; and
    securing the hydraulic cylinder to the jack housing using the first mounting ear and the second mounting ear such that the cylinder port is positioned at the hole through the outer surface of the jack housing.

8. The method of claim 7 wherein the kit further comprises a top cover, the method further comprising placing the top cover over a top end of the hydraulic cylinder and onto the jack housing.

9. The method of claim 8 wherein the kit further comprises a grommet and wherein the method further comprises sealing the top cover with the grommet.

10. The method of claim 7 further comprising connecting hoses to the cylinder port and an opposite cylinder port.

\* \* \* \* \*